United States Patent [19]

Kundikoff

[11] 4,128,030
[45] Dec. 5, 1978

[54] CUTTING GUIDE SQUARE

[76] Inventor: Peter Kundikoff, Rte. 1, Box 204, Escondido, Calif. 92025

[21] Appl. No.: 803,616

[22] Filed: Jun. 6, 1977

Related U.S. Application Data

[63] Continuation-in-part of Ser. No. 584,134, Jun. 5, 1975, Pat. No. 4,028,976.

[51] Int. Cl.² ............................................. B27B 9/04
[52] U.S. Cl. ........................................ 83/745; 33/96; 33/112; 83/522
[58] Field of Search ................. 83/745, 744, 743, 522; 33/32 B, 42, 43, 44, 112, 113, 96

[56] References Cited

U.S. PATENT DOCUMENTS

| 725,021 | 4/1903 | Bannihr | 33/42 |
| 1,257,683 | 2/1918 | Defenbaugh | 33/112 |
| 1,804,142 | 5/1931 | Billington | 33/112 |

FOREIGN PATENT DOCUMENTS 532738  1/1941  United Kingdom ..................... 33/112

*Primary Examiner*—Travis S. McGehee
*Attorney, Agent, or Firm*—Brown & Martin

[57] ABSTRACT

A square incorporating a guiding edge. Indicia on the square is utilized to position the guiding edge a distance corresponding to the blade platform edge offset of a power saw. The indicia are utilized both in measuring the offset and in positioning the guiding edge. Finger openings are provided so that the square may be held onto the work piece while the saw is positioned and guided by contact with the guiding edge. Marking serrations make it possible to mark lines at selected positions parallel to the edge of the work piece.

5 Claims, 8 Drawing Figures

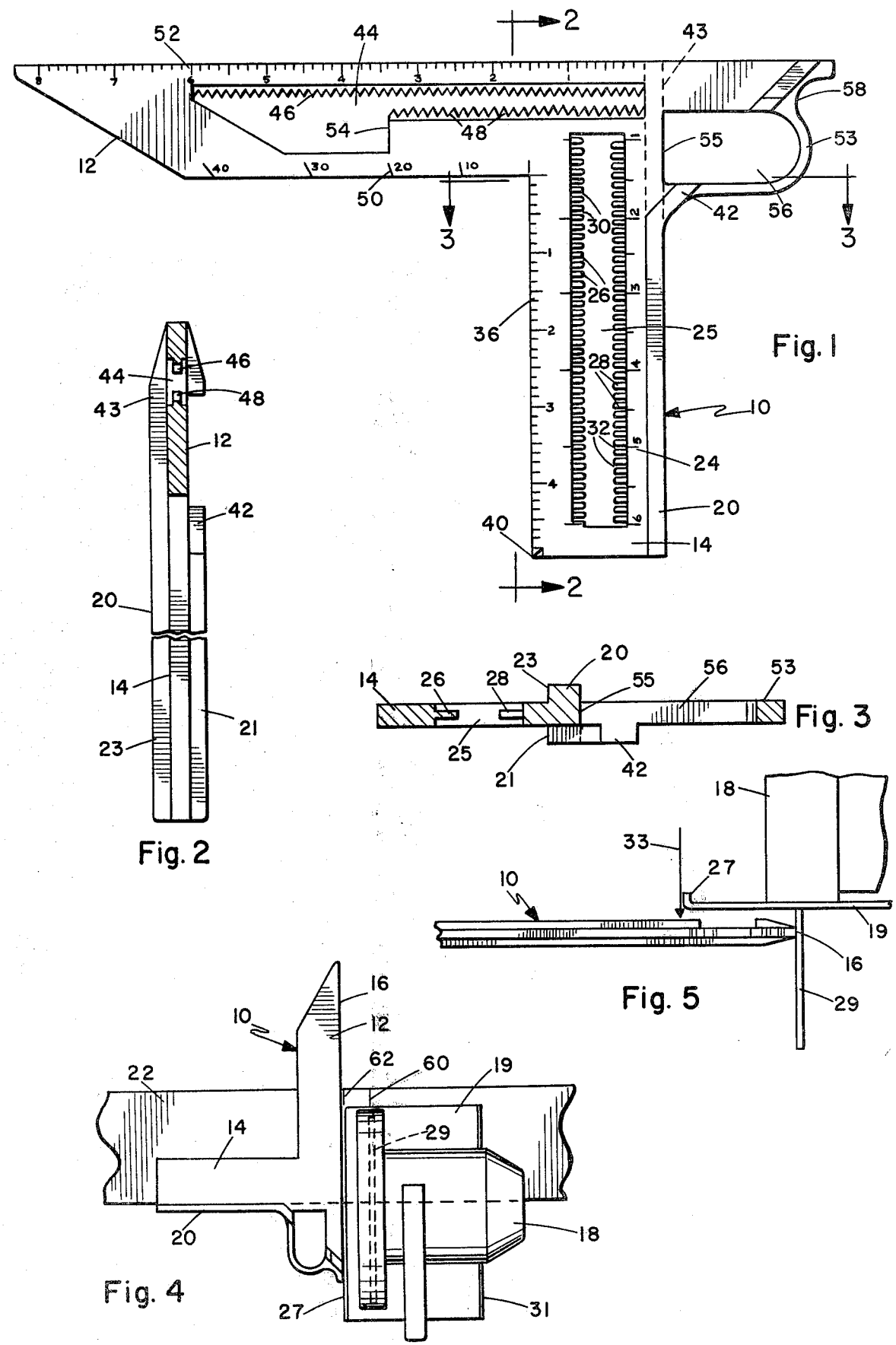

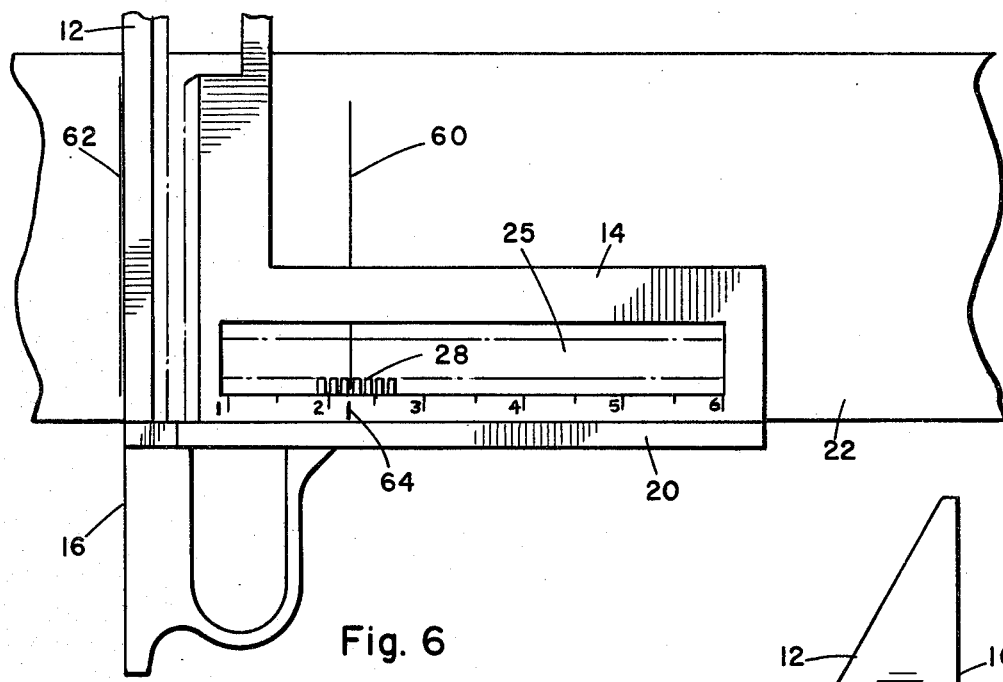
Fig. 6
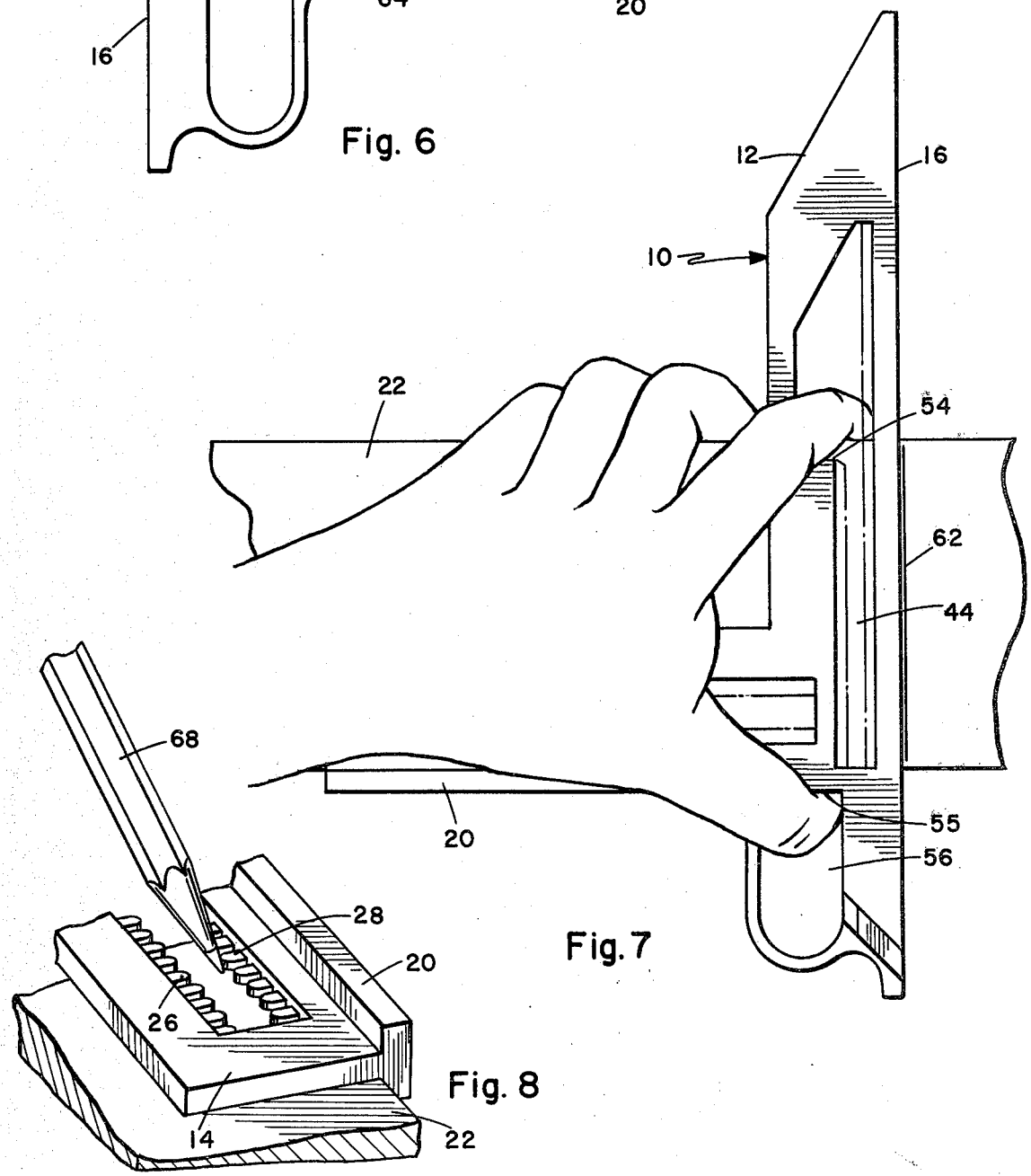
Fig. 7
Fig. 8

CUTTING GUIDE SQUARE

RELATION TO OTHER APPLICATIONS

This application is a continuation-in-part of application Ser. No. 584,134, filed June 5, 1975, entitled "Cutting Tool Guidance System", now U.S. Pat. No. 4,028,976.

BACKGROUND OF THE INVENTION

As is set forth in more detail in the above identified application, conventional carpentry practice in cutting a board is first to utilize a square and/or ruler to position and then mark off the intended line of cut. The workman then manually aligns the blade of the saw, sighting through the opening in the saw platform, and aligns the blade with the scribed line. The workman then begins cutting, maintaining alignment by making minute corrections as required. The vibration of the saw, and the binding effect of corrections limits the ability to track the line after any deviation. Thus, even experienced carpenters will at times deviate from the intended line by an amount sufficient to make the completed parts unusable.

If an attempt is made to correct the deficiencies of the manual technique by utilizing the edge of the saw platform as a follower, then additional time consuming steps must be taken. A straight edge must be secured into position at the right distance from the scribed line. This distance must be determined by measurement or experimentation and is difficult to plot accurately. Then the straight edge must be clamped or otherwise mechanically secured in position.

In applicant's co-pending application, a novel square is provided in conjunction with a customized or adjustable indicator. The square overlies the work piece and has a reduced tendency to move about. Therefore, a relatively simple pinning system may be utilized to hold the square in position. The indicators reduce the time and increase the accuracy of establishing the blade platform edge offset for positioning the square relative to the line of intended cut. However, the pins and indicator must be carried separately and they frequently will not be readily available when the carpenter is ready to make a particular cut.

It is therefore desirable to have a device that improves on the accuracy and convenience of applicant's previous device and over the prior art by eliminating the need for a separate indicator means for establishing the blade-platorm edge offset and for positioning the square the required distance from the line of intended cut for properly guiding the saw. In addition, it is desirable to have a cutting guide square that eliminates the necessity for mechanically fastening the square to the work piece.

SUMMARY OF THE INVENTION

In an exemplary embodiment of the invention, the cutting guide square incorporates a planar guide member and a co-planar base member. The base member and guide member comprises generally rectangular members joined at right angles. The outer edge of the guide member forms a guiding edge for positioning and guiding the platform of a power saw. A flange is affixed to the outer edge of the base member so that the flange may be butted up against the edge of the work piece to establish a right angular relationship between the edge of the work piece and the line of intended cut. The base member also incorporates blade-platform edge offset calibrations consisting of indicia for measuring the offset between the edge of the platform and the cutting blade on a particular power saw. Once measured and noted by the operator, the appropriate indicia is utilized to position the square at the proper distance from the line of intended cut. The square is held in position on the work piece by utilizing the finger openings which provide the operator with sufficient mechanical advantage to securely hold the square on the work piece, so that the square does not move from the initial position during set up and during the actual guiding of the saw as it proceeds through the work piece. A terminal portion of the flange is arranged at 45° to the principal flange thereby permitting the square to be utilized in guiding the saw at a 45° relationship to the edge of the work piece.

The overlying relationship of the square to the work piece is also utilized to advantage in marking parallel lines. An opening in the guide member is provided with a plurality of serrations for positioning a marking pencil at a selected distance from the edge of the work piece. The square may then be slid along the edge of the work piece resulting in a parallel line being marked on the work piece. The line may be utilized for further measurements or to position the saw for cutting parallel to the edge.

It is therefore an object of the invention to provide a new and improved cutting guide square that combines multiple functions. The square combines the functions of determining blade-platform edge offset, positioning the square, securing the square and guiding the power saw. The use of the finger pressure openings eliminates the need for mechanically fastening the square. The square provides for marking and cutting at 45° right angles and parallel relationship to the edge of the work piece. The specially adapted indicia makes it possible to accurately measure and position the square relative to the blade platform relationship.

Other objects and many attendant advantages of the invention will become more apparent upon a reading of the following detailed description together with the drawings in which like reference numerals refer to like parts throughout and in which:

BRIEF DESCRIPTION OF THE DRAWINGS

FIG. 1 is a top plan view of the tool.

FIG. 2 is an enlarged secitonal view taken on line 2—2 of FIG. 1.

FIG. 3 is an enlarged sectional view taken on line 3—3 of FIG. 1.

FIG. 4 illustrates the set up for guiding a saw in making a cut.

FIG. 5 illustrates the method of determining the blade to platform edge spacing.

FIG. 6 illustrates the location of a reference mark for proper positioning of the tool.

FIG. 7 illustrates the method of holding the tool in place.

FIG. 8 is a perspective view illustrating the cooperation of alignment pins with a marking pencil.

DETAILED DESCRIPTION OF THE DRAWINGS

Referring now to the drawings, there is illustrated a cutting guide square 10 incorporating a guide member 12 and base member 14. The guide member and base member are co-planar and are formed into a unitary sheet such as by die casting. The outer edge of the guide member 12 is a straight guiding edge 16. The outer edge of the base member 14 incorporates a transverse flange 20. The flange extends from both sides of the base member forming transverse abutment surfaces 21 and 23. The surfaces 21 and 23 are at right angles to the guiding edge 16. Thus when the square is positioned on a work piece, such as the board 22 in FIG. 4, and flange 20 placed in contact with the edge of the board 22, then the guiding edge 16 will be at right angles to the contacted edge. A power saw 18 incorporating a platform 19 may then be positioned against the guiding edge 16 of the saw. When the saw is operated in a normal manner with pressure maintained against the guiding edge 16, a straight cut at right angles to the edge of the wood will be made.

Blade-platform edge offset is defined as the distance between the blade 29 and the contacted edge of the platform at 27 or 31. Blade-platform edge offset is measured utilizing the blade-platform edge offset calibrations 24. The calibrations are accommodated on the base member 14 of the square without disturbing the normal measurement and line drawing functions of that portion of the base by utilizing an elongated opening 25. A plurality of alignment pins 26 and 28 are positioned along the longitudinal edges of the opening. The first time that the square is utilized with a particular saw, the workman will position the saw on a pair of blocks so that the blade just clears the flat surface on which the blocks rest. The edge 16 is then pressed up against the blade, as in FIG. 5. The workman then sights vertically along the edge 27 of the platform as indicated by arrow 33, to determine which of the alignment pins 26 or 28 lines up with the edge of the platform. To assist in this alignment, the pins are staggered so that the pins 26 align with openings 32 between the pins 28 and the pins 28 align with openings 30 between the pins 26. This staggered arrangement of the pins permits a more precise determination of the proper pin to correspond to the blade offset platform for the particular saw. The set up process is repeated for the opposite platform edge 31 so that the operator identifies particular alignment pins for both edges. The pins may be suitably marked for future reference. Thereafter, when the device is utilized, the operator merely places the square against the edge of the work piece 22, and slides the square along the work piece until the appropriate pin, indicated by a mark 64, aligns up with the mark 60 corresponding to the line of intended cut, as in FIG. 6. By then marking a reference line 62 with a pencil along the edge 16, the proper offset is determined. The square is then turned over and the edge 16 aligned with the reference line 62, as in FIG. 7. When the saw is positioned against the guiding edge 16, as in FIG. 4, the blade will be in position to cut along the line 60 of intended cut.

The pins 26 and 28 are also approximately one-third the thickness of the guide member to aid in the precision of alignment and marking. FIG. 8 illustrates the manner in which a pencil 68 may be placed against an alignment pin 28 so that the point of the pencil contacts the work piece 22 directly under the end of the pin 28.

The base member 14 is also provided with a conventional scale 36, which is utilized to mark off distances from the inner edge of the guide member 12. A terminal portion of the scale 36 is a protractor origin point 40 which is utilized in association with the protractor markings 50 on the inner edge of the guide member 12.

A portion of the flange 20 closest to the guiding edge 16 is split into a straight terminal portion 43 on one side of base member 14 and a 45° offset terminal portion 42 on the other side. The portion 42 may be utilized to establish a 45° relationship between the edge of the work piece and the guiding edge 16.

A parallel relationship between the flange 20 and a line of intended cut is established through the use of the marking opening 44. The opening incorporates a plurality of marking serrations 46 and 48 along opposed elongated sides. The marking serrations are staggered in the manner of the alignment pins 28 and 30 so that a marking location can be selected at small incremental distances. Since the opening 44 is continuous, the operator need not lift the marking pencil as the proper position is selected and can inspect the surface of the work piece to avoid knot holes and the like. The operator holds a pencil in the selected trough between the marking serrations and draws the square along the edge of the work stock to make a parallel line. The serrations have a thickness approximately one-third that of member 12 and the troughs of the serrations are spaced from the member 12 so that it is possible to mark directly under the troughs by positioning the pencil in a manner analogous to that illustrated for the alignment pins in FIG. 8. The guide member 12 also includes a conventional scale 52 which may be utilized to measure distances from the flange 20. The scale is particularly useful in selecting an appropriate marking serration.

The use of the square in all modes is facilitated by a plurality of finger openings and pressure points. Guide member 12 has an extension 53 in which is a finger opening 56 having a thumb pressure flat 55 at the flange 20. Depending upon the relationship of the square to the wood, the pressure to hold the flange 20 against the edge of the board 22, and the guide member against the upper surface of the board 22, may be applied by the thumb or finger through the opening 56. In other orientations such as where the 45° flange terminus 42 is utilized, a thumb pressure recess 58 may be most efficiently utilized to obtain the necessary mechanical advantage, so that hand pressure alone is sufficient to the square in relationship to the board or other work piece during positioning and guiding of the power saw 18. A finger grip recess 54 within the marking opening 44 is positioned to be particularly useful in the cutting of conventional 2 × 4 members. The 2 × 4 has a nominal width of 3-⅝ inches and therefore extends just beyond the recess 54. It is therefore possible to obtain a good binding relationship on a 2 × 4 by placing the thumb through the opening 56 and the forefinger around the 2 × 4 through the recess 54, as in FIG. 7.

Having described my invention, I now claim:

1. A cutting guide square for use with a power saw having a blade extending below the plane of the base comprising:

a planar guide member and a co-planar base member, said guide member comprising a thickness of sheet material and having an outer straight guiding edge,
said base member having a flange means for engaging the edge of a workpiece on which said base member may be received, said flange lying in a plane perpendicular to said planar guide member and said straight guiding edge,
said flange being secured along and extending from at least one side of said base member, at least a portion of said base member lying between the adjacent portion of said flange and said guide member, blade-platform edge offset indicia means for establishing the distance by which the blade of a power saw is offset from the edge of the saw platform and for positioning the guiding edge of said square on a workpiece at the corresponding distance from the location of a line of intended cut, said guide member incorporating at least one finger grip means comprising an opening for grasping said square and said workpiece through said square.

2. A cutting guide square according to claim 1 wherein:

said guide member extends beyond said flange on the side away from the nominal position of said workpiece, said finger grip opening means is in the extended portion of said guide member.

3. A cutting guide square according to claim 2 wherein:

said guide member incorporates at least two spaced finger grip openings.

4. A cutting guide square for use with a power saw having a blade extending below the plane of the base comprising:

a planar guide member and a co-planar base member, said guide member comprising a thickness of sheet material and having an outer straight guiding edge, said base member having a flange lying in a plane perpendicular to said planar guide member and said straight guiding edge, said flange being secured along and extending from at least one side of said base member, at least a portion of said base member lying between the adjacent portion of said flange and said guide member, blade-platform edge offset indicia means for establishing the distance by which a blade of the power saw is offset from the edge of the saw platform and for positioning the guiding edge of said square on the workpiece at the corresponding distance from the location of the line of intended cut, said blade offset indicia means comprising an elongated opening in said base member, said elongated opening having parallel indicia edges having indicia increments, said indicia increments comprising alignment pins extending toward the opposed indicia edge, and said alignment pins having a thickness substantially less than that of said base member.

5. The cutting guide square according to claim 4 wherein:

said guide member is penetrated by an elongated opening having two internal edges that are generally parallel to said guide edge, at least one of said internal edges incorporating a plurality of serrations for positioning a marking device in contact with a work piece.

* * * * *